United States Patent
Blincow

(10) Patent No.: US 10,472,099 B2
(45) Date of Patent: Nov. 12, 2019

(54) METHOD FOR CONSTRUCTING STRUCTURAL BODIES IN A ZERO GRAVITY ENVIRONMENT

(71) Applicant: John Jeffrey Blincow, Alta Loma, CA (US)

(72) Inventor: John Jeffrey Blincow, Alta Loma, CA (US)

(*) Notice: Subject to any disclaimer, the term of this patent is extended or adjusted under 35 U.S.C. 154(b) by 362 days.

(21) Appl. No.: 15/040,816

(22) Filed: Feb. 10, 2016

(65) Prior Publication Data

US 2016/0185471 A1     Jun. 30, 2016

Related U.S. Application Data

(63) Continuation-in-part of application No. 14/986,262, filed on Dec. 31, 2015.

(60) Provisional application No. 62/098,376, filed on Dec. 31, 2014.

(51) Int. Cl.
| | |
|---|---|
| *B64G 4/00* | (2006.01) |
| *B64G 99/00* | (2009.01) |
| *B64G 1/10* | (2006.01) |
| *B64G 1/64* | (2006.01) |

(52) U.S. Cl.
CPC .............. *B64G 4/00* (2013.01); *B64G 1/1078* (2013.01); *B64G 1/646* (2013.01); *B64G 9/00* (2013.01); *B64G 2004/005* (2013.01)

(58) Field of Classification Search
CPC ........ B64G 4/00; B64G 1/646; B64G 1/1078; B64G 9/00; B64G 2004/005
See application file for complete search history.

(56) References Cited

U.S. PATENT DOCUMENTS

2015/0266147 A1* 9/2015 Reid ................. B23P 21/004
                                                                                  29/525.01

OTHER PUBLICATIONS

Feast et al, A Design for an Orbital Assembly Facility for Complex Missions, Oct. 1, 2008.*

\* cited by examiner

*Primary Examiner* — Richard Chang

(57) ABSTRACT

A method for autonomously constructing structural bodies in a zero gravity environment utilizes an assembly line space structure to fabricate segments for constructing a modular space structure. An assembly housing provides an open ended structure through which materials are processed in order to construct a segment. The materials are loaded into a plurality of workstations positioned along the assembly housing through the use of a plurality of external manipulators adjacently connected to the assembly housing. Each of the plurality of workstations provides the equipment for sequentially loading materials into the assembly housing. An assembly line conveyor, positioned throughout the plurality of workstations, guides materials through the assembly housing as the materials are mated to form the segment. Upon completion of the segment, a plurality of segment transport units transports the segment to an orbital construction site, wherein the segment is mated with subsequent segments to form the space station.

9 Claims, 22 Drawing Sheets

METHOD FOR CONSTRUCTING STRUCTURAL BODIES IN A ZERO GRAVITY ENVIRONMENT

The current application is a continuation in part of U.S. Utility patent application Ser. No. 14/986,262 filed on Dec. 31, 2015 which claims a priority to the U.S. Provisional Patent application Ser. No. 62/098,376 filed on Dec. 31, 2014.

FIELD OF THE INVENTION

The present invention relates generally to a system and method for constructing large structures in space, such as space stations, telescopes, power stations, and large antennas. More specifically, the present invention is a method for constructing interlocking segments of a modular space structure.

BACKGROUND OF THE INVENTION

Current methods for the construction of structures in space, such as the International Space Station (ISS), is quite cumbersome and inefficient. Modules are pre-fabricated on Earth and then launched into space where said modules are mated with one another to form the overall larger structure that is the ISS. The fabricated modules are large and do not maximize the cargo space that is utilized when launching the modules into space. Resultantly, more launches are required in order to transport all of the necessary modules and components into space in order to form the space station. More launches equates to more money and a longer time interval for the completion of construction of the space station as launches require vast amounts of preparation. A more efficient method for the construction of a space station would be to transport materials to space, wherein the materials would then be used to fabricate the modules in orbit. This would allow for the more efficient transport of material, thus requiring less money and time.

Therefore, it is the object of the present invention to provide a method for autonomously constructing structural bodies in a zero gravity environment. An assembly line space structure is designed to construct sections or segments of a larger structure in orbit. In the referred embodiment, the assembly line space structure is a gateway segment assembly line (GSAL); a long box shaped assembly line that creates space station segments by welding or attaching: floor sheets, wall sheets, beams, and other major structural members or large components in one continuous sequence. The GSAL is an open ended structure that is not intended to be pressurized or manned. Materials for constructing each segment will be loaded directly from a transport spacecraft into the GSAL by use of a plurality of external manipulators mounted on an assembly housing that forms the assembly line structure. Loading mechanisms will feed segment beams into "beam guides" and floor and wall panels onto powered rollers that move the segment beams and panels into place for welding. In one embodiment, the GSAL beam guides are mounted on electric jackscrews to allow the beam guides to be repositioned in order to construct both square and wedge shaped segments. By connecting wedge shaped segments together, ringed sections of a space station can be produced that can be used to create artificial gravity under spin. Each segment may be different in terms of fabrication and the additional components that may be installed such as interior walls, electrical conduits, air ducts, etc. Codes for every segment configuration will be up-loaded to the GSAL just before each transport spacecraft arrives. Materials for constructing each segment are loaded onto the transport spacecraft in proper sequence to coincide with the given segment configuration and the order of fabrication through the GSAL.

DETAIL DESCRIPTIONS OF THE INVENTION

Figure 1:
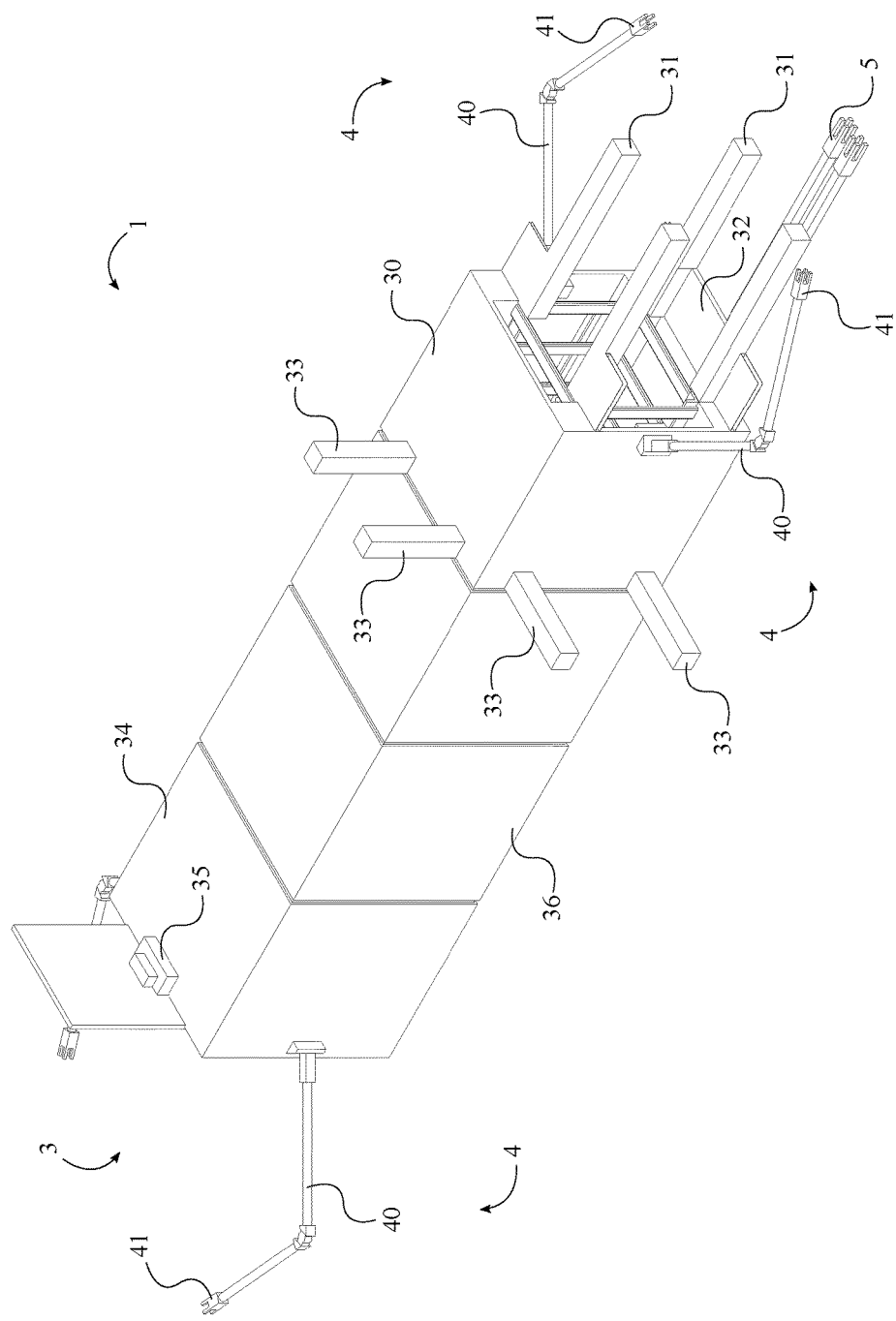
FIG. 1 is a perspective view of the assembly housing, wherein the plurality of workstations is linearly positioned along the assembly housing.

All illustrations of the drawings are for the purpose of describing selected versions of the present invention and are not intended to limit the scope of the present invention.

The present invention is a method for autonomously constructing structural bodies in a zero gravity environment using an assembly line space structure. In the preferred embodiment of the present invention, the assembly line space structure is a gateway segment assembly line (GSAL) that allows for the construction of space stations and other structures while in orbit. The GSAL is designed to be an unmanned system that receives a plurality of construction materials 80 from a transport spacecraft 8 and manufacturing instructions from a remotely situated base station. Using the construction materials 80 and the manufacturing instructions, the GSAL constructs a segment 90; the segment 90 being a single section of a modular space structure 9, a more complex and larger space station or structure. Upon construction of the segment 90 by the GSAL, the segment 90 is guided to an orbital construction site where the segment 90 is merged with an at least one subsequent segment 92 that has been previously constructed. The GSAL then continues to produce segments as instructed in order to complete the construction of the modular space structure 9.

The GSAL comprises an assembly housing 1, an assembly line conveyor 2, a plurality of workstations 3, a plurality of external manipulators 4, a spacecraft docking mechanism 5, a power source 6, and a plurality of segment transport units 7. In reference to FIGS. 1-3, the assembly housing 1 provides an open ended structure into which each of the construction materials 80 is inserted and the segment 90 formed from said materials is expelled. The plurality of workstations 3 is sequentially positioned along the assembly housing 1, wherein each of the plurality of workstations 3 provides the components needed for the orderly fabrication of the segment 90. More specifically, the plurality of workstations 3 is linearly positioned along the assembly housing 1, wherein materials are directed straight through the assembly housing 1. The plurality of workstations 3 comprises a loading station 30, an at least one specialized fabrication station 36, and a castoff station 34; the loading station 30 and the castoff station 34 being positioned opposite each other along the assembly housing 1, wherein the flow of materials is directed from the loading station 30 to the castoff station 34.

In reference to FIG. 1, the spacecraft docking mechanism 5 provides a means for securely connecting the transport spacecraft 8 to the assembly housing 1, such that the materials can be safely unloaded from the transport spacecraft 8 and loaded into the assembly housing 1. As such, the spacecraft docking mechanism 5 is adjacently connected to the assembly housing 1 and is positioned adjacent to the loading station 30, opposite the castoff station 34. The spacecraft docking mechanism 5 can provide a single point of contact or multiple points of contact between the assembly housing 1 and the transport station depending on the size of the transport spacecraft 8 and the stabilization needs.

Once the transport spacecraft 8 is engaged with the spacecraft docking mechanism 5, the plurality of external manipulators 4 is used to the unload the construction materials 80 from the transport spacecraft 8 into the assembly housing 1. Different materials are distributed to each of the plurality of workstations 3 according to the sequential assembly of the segment 90 within the GSAL, as directed by the manufacturing instructions. The loading station 30 receives the materials for forming the shell or base structure of the segment 90 and comprises a plurality of beam loaders 31 and an at least one plate loader 32 that are adjacently connected to the assembly housing 1. Each of the plurality of beam loaders 31 receives a plurality of longitudinal beams 81 from the construction materials 80, wherein the longitudinal beams 81 provides support along the length of the segment 90. Meanwhile, each of the at least one plate loader 32 receives an at least one panel 83 from the construction materials 80 for forming the floor, walls, and ceiling that are supported by the longitudinal beams.

Figure 2:
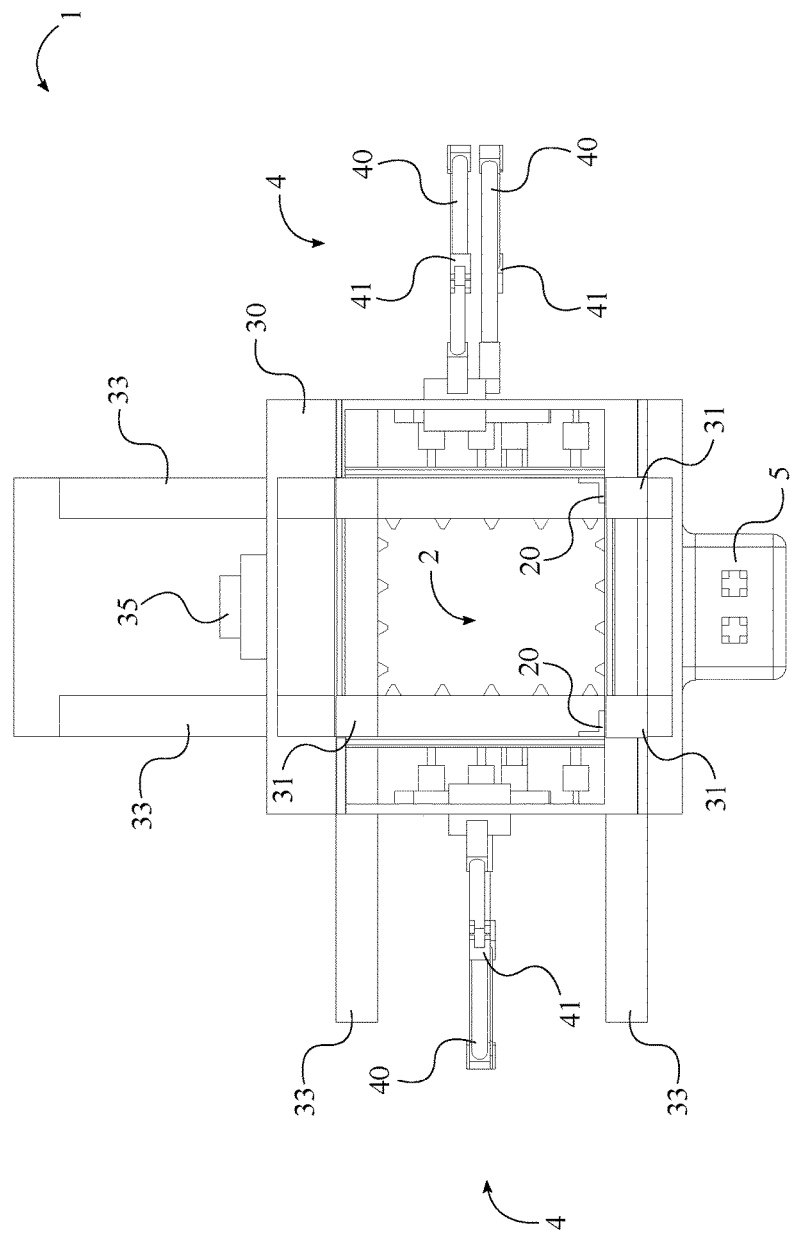
FIG. 2 is a front view of the assembly housing, showing the loading station and the plurality of beam loaders and the plurality of support beam loaders traversing through the assembly housing.
Figure 3:
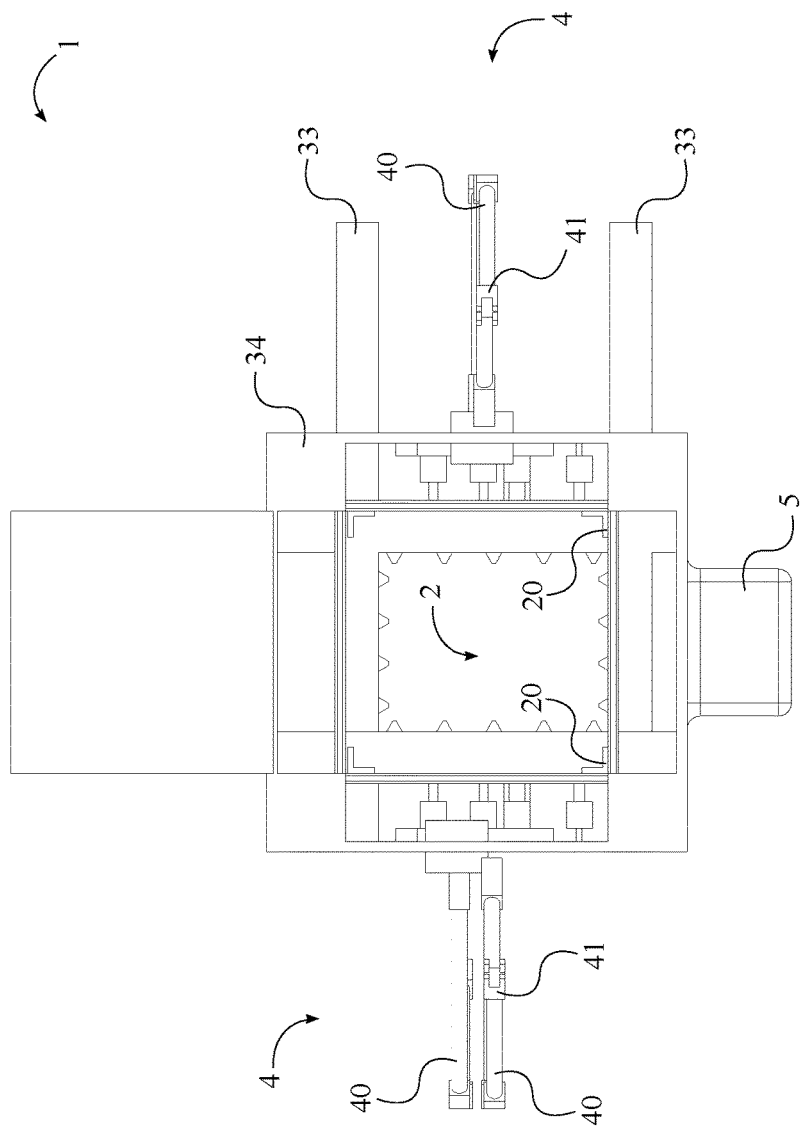
FIG. 3 is a rear view of the assembly housing, showing the castoff station.

In reference to FIGS. 1-2, the plurality of beam loaders 31 and the at least one plate loader 32 are perimetrically positioned around the assembly housing 1 opening, wherein the plurality of beam loaders 31 and the at least one plate loader 32 are aligned with the assembly line conveyor 2. The assembly line conveyor 2 is positioned within and connected to the assembly housing 1, wherein the assembly line conveyor 2 is positioned along the plurality of workstations 3. Each of the plurality of beam loaders 31 sequentially positions the longitudinal beams 81 onto the assembly line conveyor 2, while each of the at least one plate loader 32 sequentially positions the at least one panel 83 onto the assembly line conveyor 2. The assembly line conveyor 2 then directs the longitudinal beams 81 and the at least one panel 83 throughout the assembly housing 1 where the remainder of the fabrication occurs.

Figure 4:
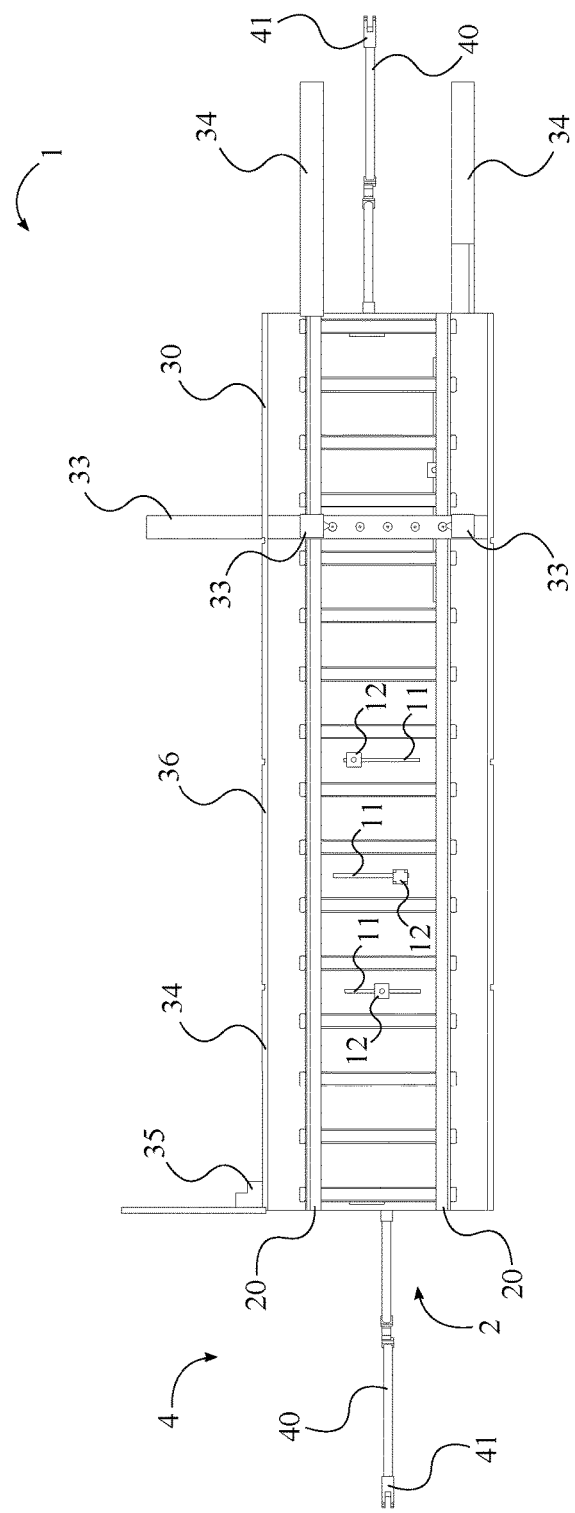
FIG. 4 is a left side sectional view showing the assembly line conveyor traversing along the assembly housing, through the plurality of workstations.

In reference to FIG. 4, the assembly line conveyor 2 controls the flow of production by regulating the movement of the construction materials 80 through the assembly housing 1, and thus, the timing of each construction operation throughout the plurality of workstations 3. The assembly line conveyor 2 can be any type of mechanism that allows for the regulated movement of materials through the assembly housing 1. An exemplar embodiment of the assembly line conveyor 2 makes use of a plurality of rollers distributed across the internal walls of the assembly housing 1, wherein the plurality of rollers guides segment 90 components from the loading station 30 to the castoff station 34. Additional embodiments of the assembly line conveyor 2 include, but are not limited to, conveyor belts, magnetic levitation tracks, pulley systems, or other assembly line techniques appropriate for moving components in a gravity free environment.

The plurality of beam loaders 31 and the at least one plate loader 32 are repositionable about the perimeter of the loading station 30, such that differently shaped segments can be formed. In reference to FIG. 2, the plurality of beam loaders 31 is positioned about the four corners of the opening to the assembly housing 1, wherein the segment 90 is formed having a rectangular cross section. In order to change the cross section of the segment 90, each of the plurality of beam loaders 31 can be rotated about the perimeter of the assembly housing 1 or pivoted in place. The at least one plate loader 32 is then repositioned in correspondence with the plurality of beam loaders 31, such that the panels are appropriately loaded along with the longitudinal beams. The plurality of beam loaders 31 and the at least one plate loader 32 can be repositioned using motorized jackscrews, a track system, or any other suitable means for changing the alignment of the plurality of beam loaders 31 and the at least one plate loader 32.

In reference to FIG. 4, the assembly line conveyor 2 comprises a plurality of beam guides 20 that directs the longitudinal beams through the assembly housing 1. Each of the plurality of beam guides 20 is a structure that supports the longitudinal beams 81 on one or more slides, and directs the longitudinal beams 81 linearly throughout the assembly housing 1. The plurality of beam guides 20 is aligned with the plurality of beam loaders 31, such that each of the longitudinal beams 81 is loaded from the plurality of beam loaders 31 directly onto the plurality of beam guides 20. The plurality of beam guides 20 is also repositionable with the plurality of beam loaders 31 in order to form differently shaped segments. Similar to the plurality of beam loaders 31, the plurality of beam guides 20 can be repositioned using electric jackscrews, or any other suitable mechanism.

In reference to FIGS. 1-2, the loading station 30 further comprises a plurality of support beam loaders 33 for mating wall studs and cross beams with the longitudinal beams. The plurality of support beam loaders 33 is positioned opposite the plurality of beam loaders 31 and the at least one plate loader 32, wherein the plurality of support beam loaders 33 is positioned in between the plurality of beam loaders 31 and the castoff station 34. Each of the plurality of support beam loaders 33 receives a plurality of cross-beams 82 from the construction materials 80, being either wall studs or cross beams that are sequentially loaded into the assembly housing 1 to be mated with the longitudinal beams 81 and the at least one panel 83. The assembly line conveyor 2 directs the longitudinal beams 81 and the at least one panel 83 through the loading station 30 to the plurality of support beam loaders 33, where each of the cross-beams 82 is then positioned in relation to the longitudinal beams 81 by the plurality of support beam loaders 33.

Each of the plurality of support beam loaders 33 is adjacently connected to the assembly housing 1 and traverses through the assembly housing 1, wherein each of the plurality of support beam loaders 33 provides an entry into the assembly housing 1. Each of the cross-beams 82 is first loaded into the plurality of support beam loaders 33 by the plurality of external manipulators 4. The plurality of support beam loaders 33 then sequentially inserts the cross-beams 82 into the assembly housing 1 to be mated with the longitudinal beams 81 and form a frame structure 91. Similar to the plurality of beam loaders 31 and the at least one plate loader 32, each of the plurality of support beam loaders 33 is repositionable about the perimeter of the assembly housing 1. This allows each of the plurality of support beam loaders 33 to be moved in correspondence with the plurality of beam loaders 31 and the at least one plate loader 32 in order to form differently shaped segments.

The assembly line conveyor 2 directs the frame structure 91 from the loading station 30 to the at least one specialized fabrication station 36; the at least one specialized fabrication station 36 being positioned in between the loading station 30 and the castoff station 34. Each of the at least one specialized fabrication station 36 is designed and equipped to outfit the segment 90 with a plurality of specialized materials 84 from the construction materials 80. For example, the at least one specialized fabrication station 36 can be designed to install electrical conduits, air ducts, etc. Similar to the loading station 30, each of the specialized materials 84 is supplied to each of the at least one specialized fabrication station 36 through the plurality of external manipulators 4. Additive manufacturing mechanisms can also be fitted to fabricate items for installment.

Figure 5:
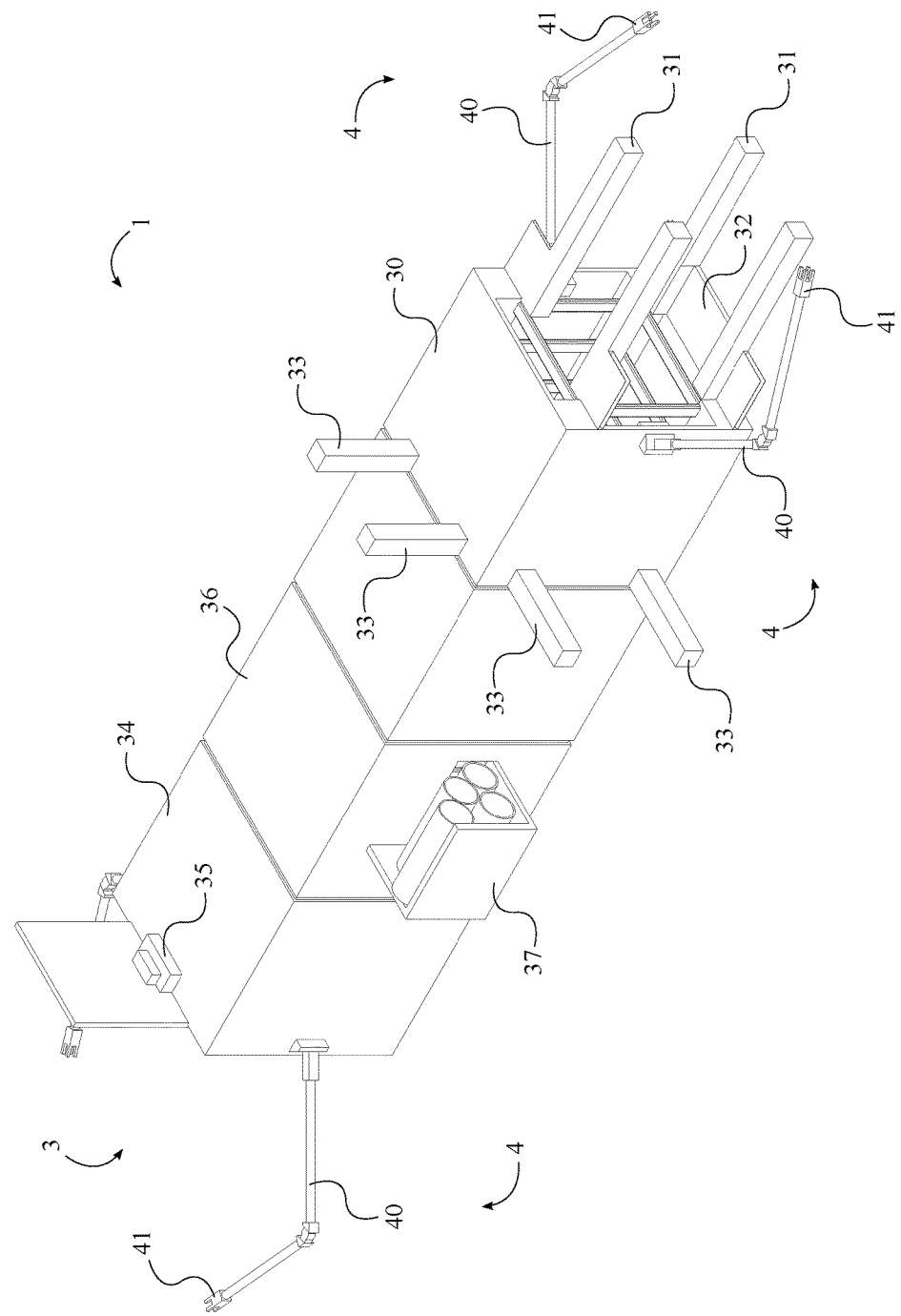
FIG. 5 is a perspective view showing the at least one material loader of the at least one specialized fabrication station.

In reference to FIG. 5, each of the at least one specialized fabrication station 36 comprises an at least one material loader 37 that is used to direct the specialized materials 84 through the assembly housing 1. As such, each of the at least one material loader 37 is adjacently connected to the assembly housing 1 and traverses through the assembly housing 1. Each of the specialized materials 84, such as electrical conduits or air ducts, is first loaded into the at least one material loader 37 by the plurality of external manipulators 4. The at least one material loader 37 then sequentially inserts the specialized materials 84 into the assembly housing 1 to be appropriately positioned within the frame structure 91 as dictated by the manufacturing instructions. Each of the at least one material loader 37 may also be repositionable about the perimeter of the assembly housing 1 in order to account for the various types of segments that may be constructed.

Once the specialized materials 84, such as electrical conduits and air ducts, are added to the frame structure 91, the assembly line conveyor 2 directs the segment 90 to the castoff station 34. The castoff station 34 makes the final addition of end panels and cross sectional walls to the segment 90, and as such comprises a wall loader 35. Cross sectional wall panels from the at least one panel 83 are loaded into the wall loader 35 by the plurality of external manipulators 4, wherein the wall loader 35 then places the cross sectional wall panels into position along the segment 90 as the segment 90 is expelled from the assembly housing 1. The wall loader 35 is positioned opposite the at least one specialized fabrication station 36, about the open end of the assembly housing 1, allowing the cross sectional wall panels to be readily pushed into place by the wall loader 35.

In reference to FIG. 4, the assembly housing 1 comprises an assembler guide network 11 and a plurality of robotic assemblers 12 that are provided to properly mate all of the construction materials 80 to each other as each of said construction materials 80 is guided through the assembly housing 1. The assembler guide network 11 is positioned adjacent to the assembly line conveyor 2, throughout the plurality of workstations 3, and provides a series of mounts for the plurality of robotic assemblers 12. Each of the plurality of robotic assemblers 12 is slidably connected to the assembler guide network 11, wherein each of the plurality of robotic assemblers 12 can traverse in two dimensions about the inner surfaces of the assembly housing 1. The plurality of robotic assemblers 12 provides the means for mating and installing the construction materials 80 within the assembly housing 1. As such, each of the plurality of robotic assemblers 12 provides a means for welding, bolting, clamping, gluing, screwing, riveting, or otherwise affixing said construction materials 80 to one another. For example, each of the plurality of robotic assemblers 12 could be equipped with a friction stir welder or arc welding tools for joining the seams between materials used to form the segment 90.

The plurality of external manipulators 4 allows the present invention to unload the construction materials 80 from the transport spacecraft 8 and distribute the construction materials 80 about the assembly housing 1. In reference to FIG. 1, each of the plurality of external manipulators 4 is adjacently connected to the assembly housing 1 opposite the assembly line conveyor 2, wherein the each of plurality of external manipulators 4 is able to maneuver the construction materials 80 outside of the assembly housing 1. In addition to providing a means for maneuvering the construction materials 80 outside of the assembly housing 1, the plurality of external manipulators 4 may also provide an additional means for mating the construction materials 80.

Figure 6:
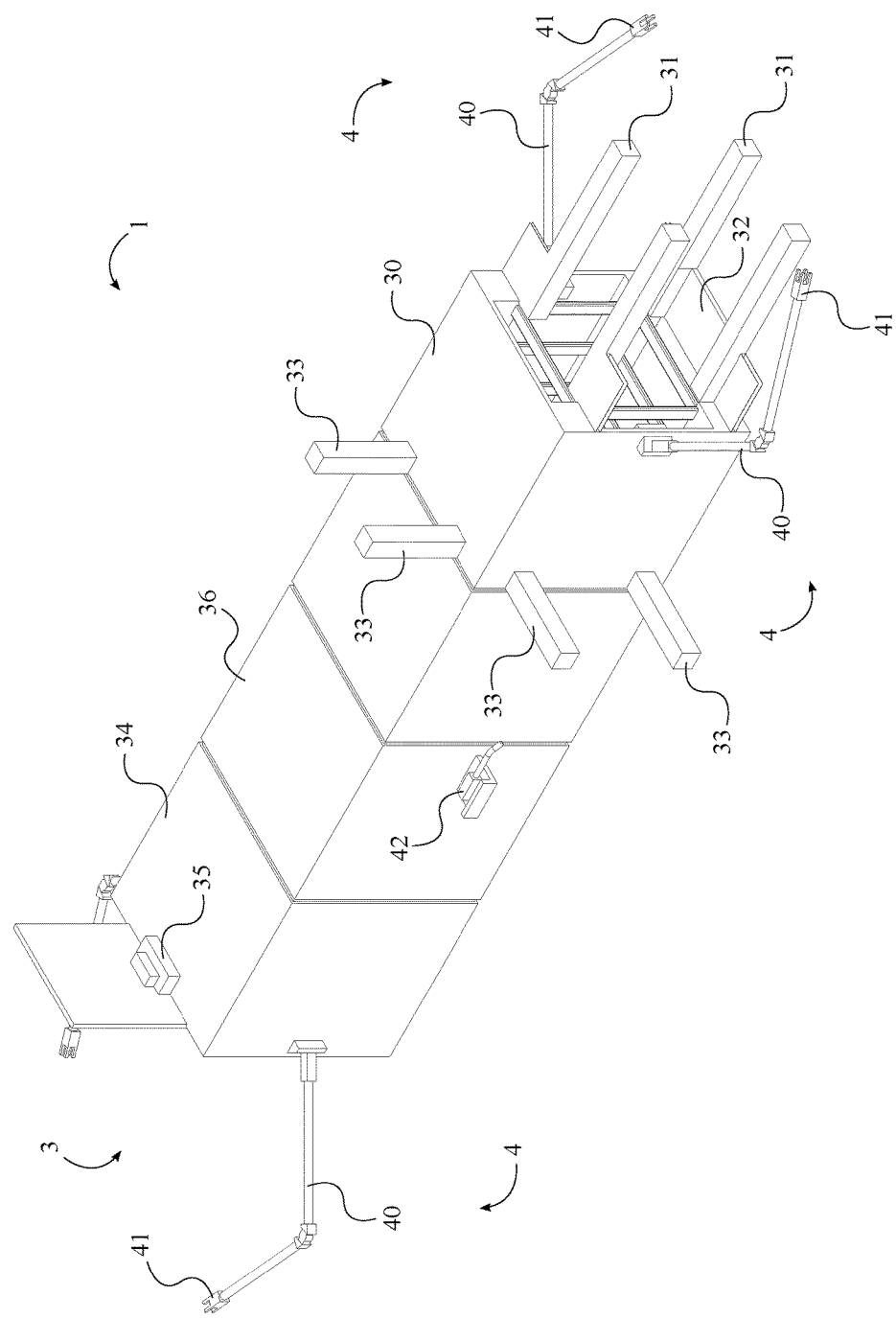
FIG. 6 is a perspective view showing the second manipulator extremity being attached to the assembly housing.

In reference to FIG. 6, to provide a means for both grasping the construction materials 80 and mating the construction materials 80, each of the plurality of external manipulators 4 comprises a maneuverable arm 40, a first manipulator extremity 41, and a second manipulator extremity 42. The maneuverable arm 40 is a multi-jointed appendage adjacently connected to the assembly housing 1 that allows for three dimensional movement about the assembly housing 1. The first manipulator extremity 41 is terminally attached to the maneuverable arm 40 opposite the assembly housing 1 and provides a means for securely grasping the construction materials 80 in order to maneuver said construction materials 80 about the assembly housing 1. The first manipulator extremity 41 may utilize mechanical mechanisms, electromagnetic mechanisms, or any other mechanisms suitable for securely grasping and maneuvering an object in a gravity free environment.

The second manipulator extremity 42 provides a means for mating the construction materials 80 (e.g. welding, bolting, riveting) and is adjacently attached to the assembly housing 1, wherein the second manipulator extremity 42 is interchangeable with the first manipulator extremity 41. To interchange the first manipulator extremity 41 and the second manipulator extremity 42, the maneuverable arm 40 directs the first manipulator extremity 41 to a dock, or attachment mechanism, wherein the first manipulator extremity 41 is attached to the assembly housing 1. The maneuverable arm 40 is then disengaged from the first manipulator extremity 41 and positioned to engage with the second manipulator extremity 42. The second manipulator extremity 42 is then attached to the maneuverable arm 40 and detached from the assembly housing 1, wherein the maneuverable arm 40 can freely control the second manipulator extremity 42.

Figure 7:
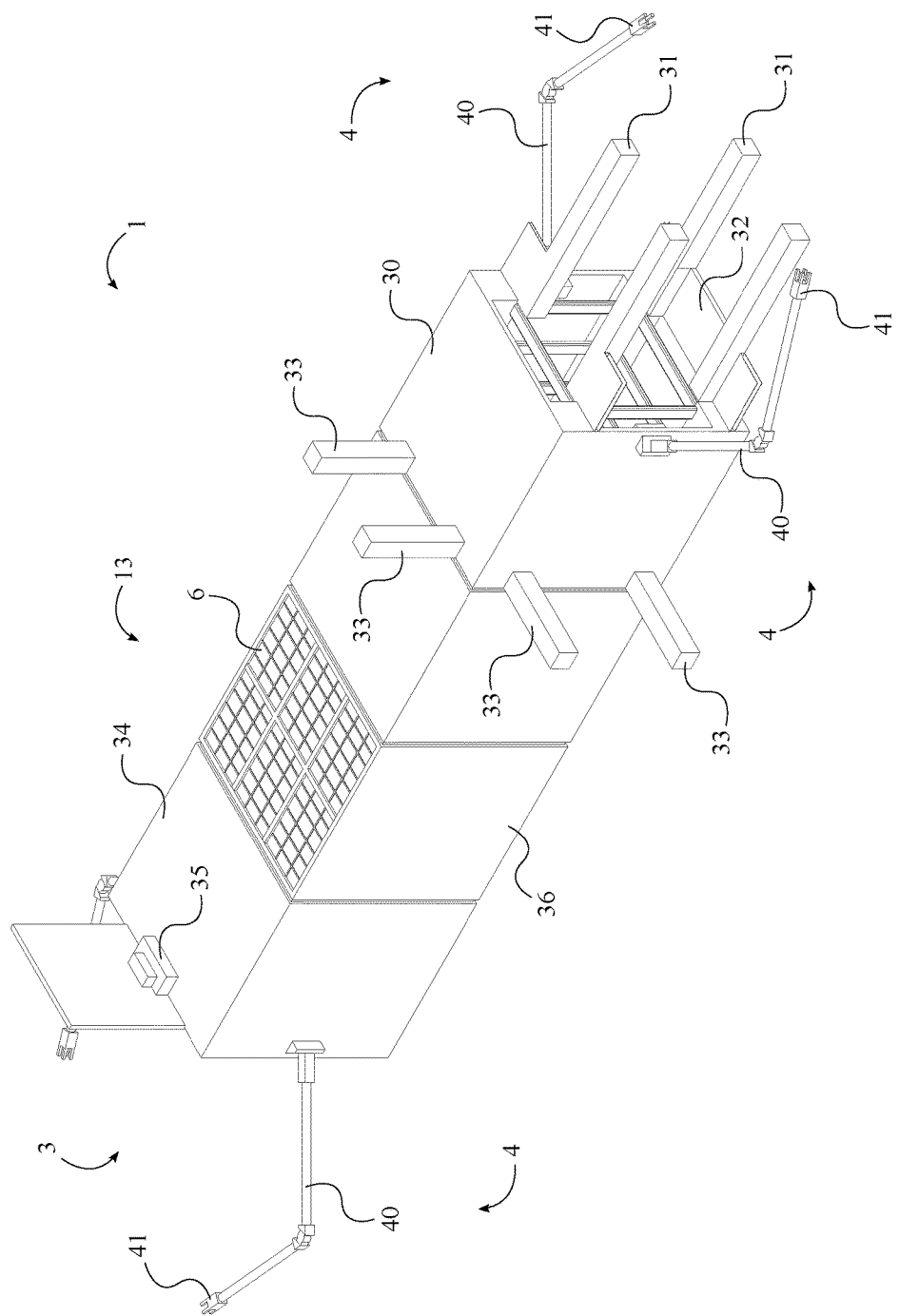
FIG. 7 is a perspective view of the power source being a solar array integrated into the outer surface of the assembly housing.
Figure 8:
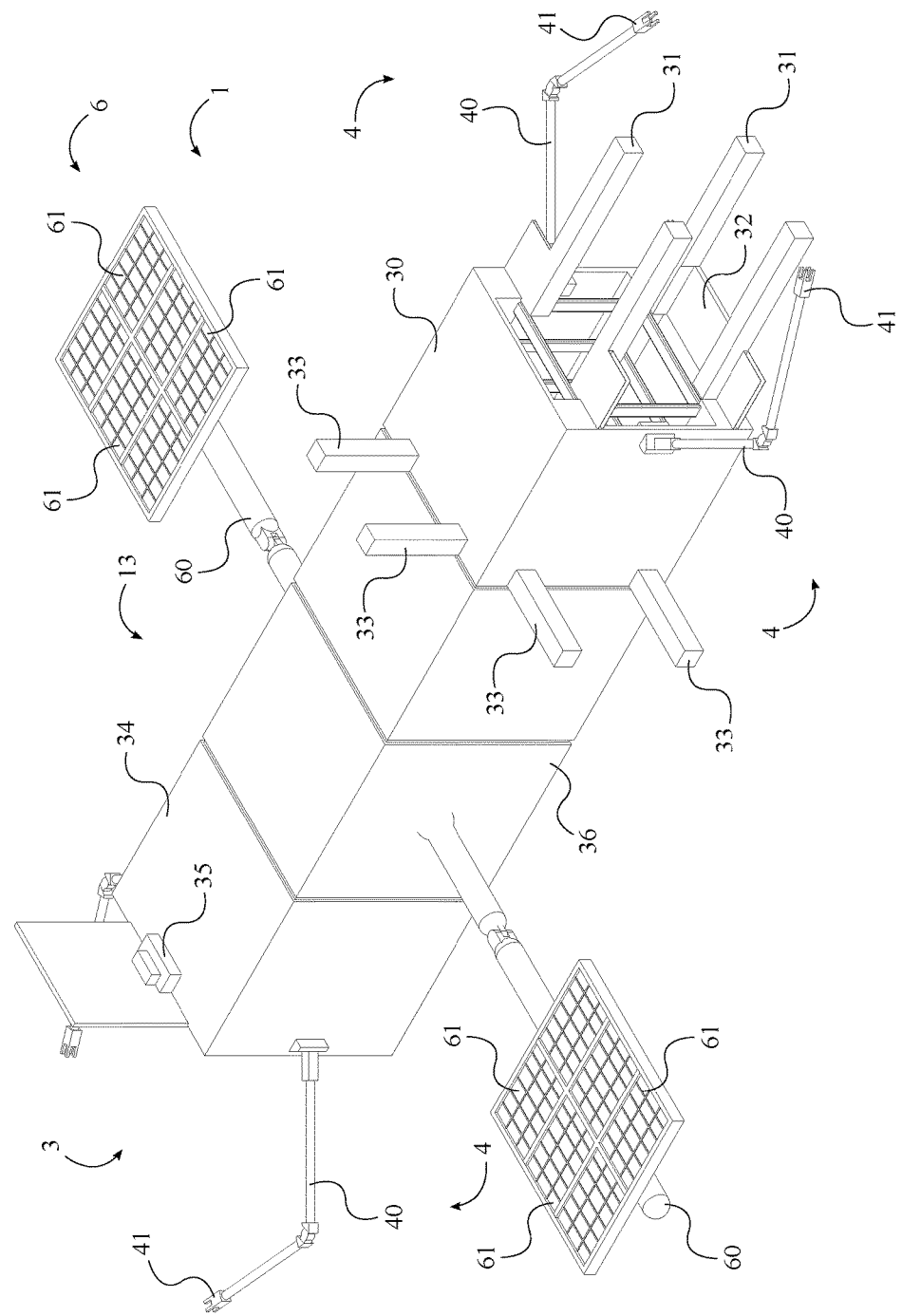
FIG. 8 is a perspective view of the power source being a solar array, wherein a plurality of solar cells is connected along an extension arm.

The power source 6 provides power to the other components of the present invention and, as such, the power source 6 is electrically connected to the plurality of workstations 3, the assembly line conveyor 2, the plurality of robotic assemblers 12, and the plurality of external manipulators 4. The power source 6 can be any mechanism that provides a means for generating electricity, such as a fuel cell or solar array. In embodiments where the power source 6 is a solar array, the power source 6 is adjacently connected to the assembly housing 1 opposite the assembly line conveyor 2, wherein the power source 6 is externally positioned about the assembly housing 1. In reference to FIG. 7, in one solar array embodiment, the power source 6 is integrated into an outer surface 13 of the assembly housing 1, such that the plurality of external manipulators 4 can readily be maneuvered around the power source 6. In reference to FIG. 8, in another solar array embodiment, the power source 6 comprises an extension arm 60 and a plurality of solar cells 61; the extension arm 60 being adjacently connected to the assembly housing 1 and the plurality of solar cells 61 being adjacently connected to the extension arm 60. The plurality of solar cells 61 harnesses the solar energy, while the extension arm 60 allows the plurality of solar cells 61 to be repositioned in order to optimally harness the solar energy.

Figure 10:
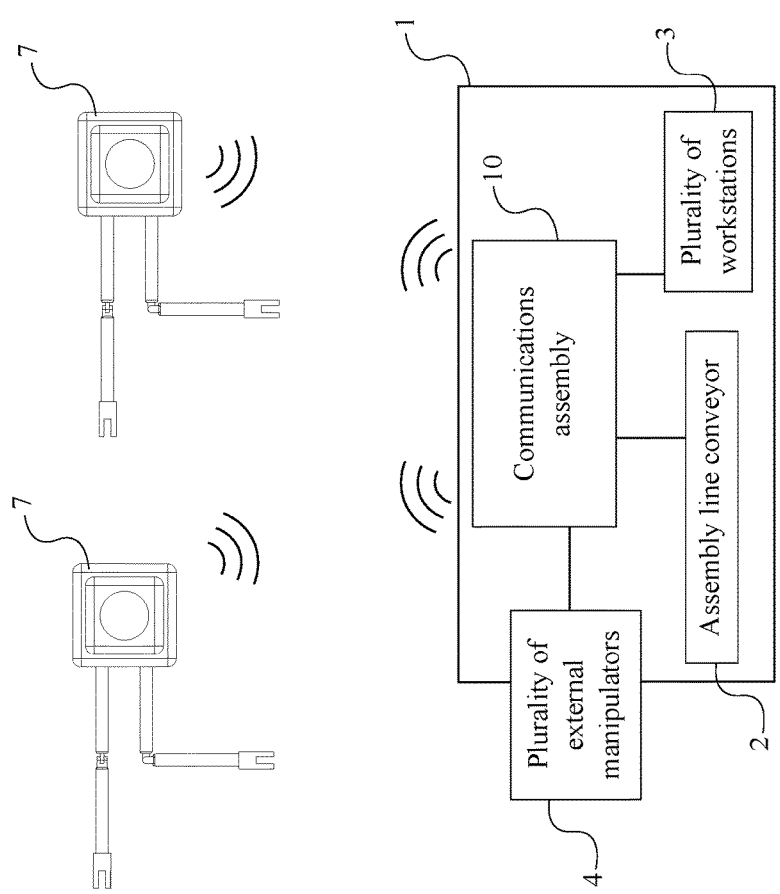
FIG. 10 is a diagram showing the communicable connections between the communications assembly and other components.

In order to communicate the manufacturing instructions with the components of the present invention, the assembly housing 1 comprises a communications assembly 10. The communications assembly 10 includes the electronic equipment that is needed to wirelessly communicate with other sub-systems and the remotely situated base station. The communications assembly 10 receives the manufacturing instructions from the remotely situated base station, analyzes and interprets the manufacturing instructions, and then relays individual instructions to the appropriate sub-systems. As such, the communications assembly 10 is communicably coupled to the plurality of workstations 3, the plurality of external manipulators 4, and the assembly line conveyor 2 through either a wired or wireless connection, as depicted in FIG. 10.

Figure 9:
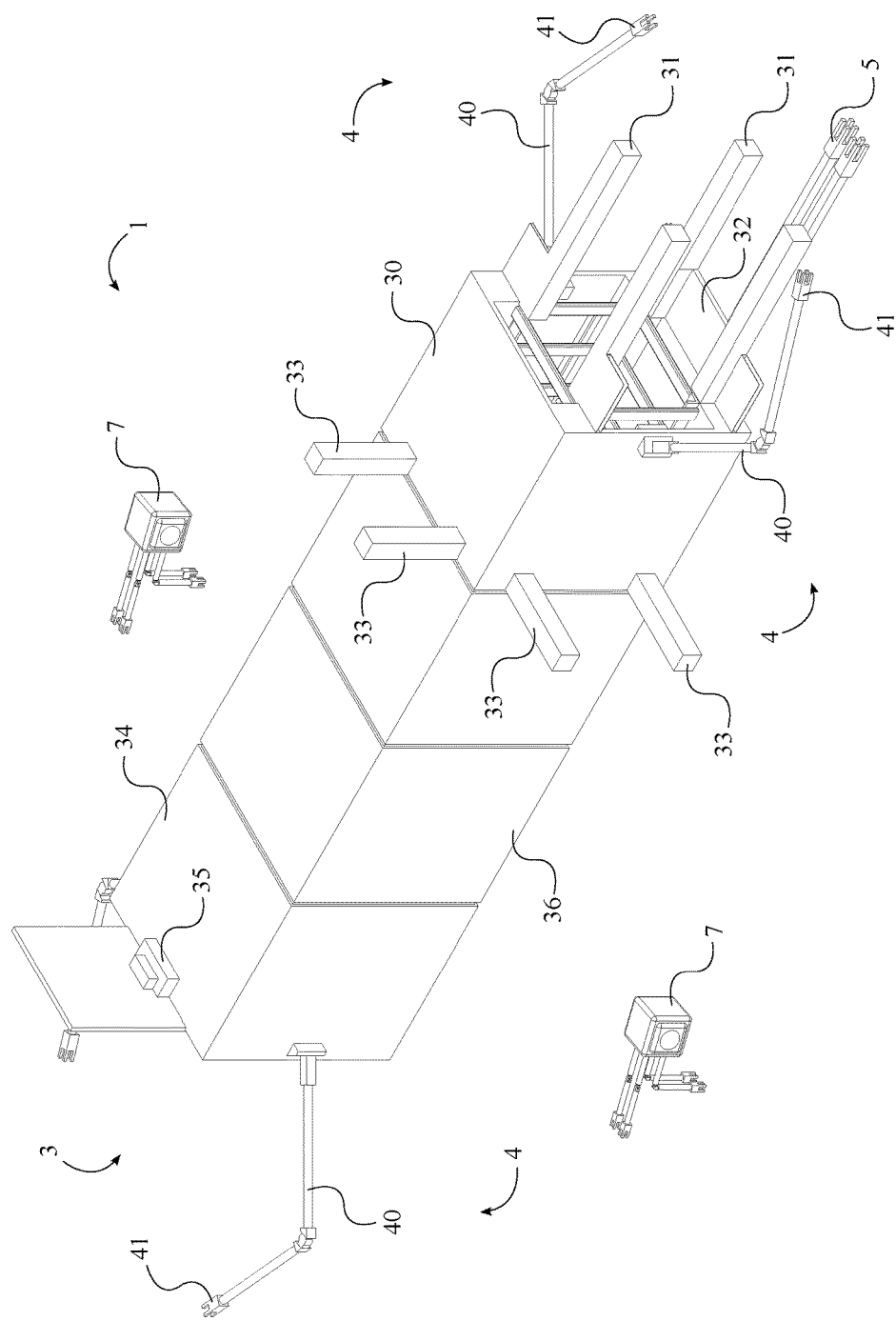
FIG. 9 is a perspective view showing the plurality of segment transport units used to retrieve the segment from the assembly housing.

In reference to FIG. 9, the plurality of segment 90 transport units 7 is used to transport the completed segment 90 from the assembly housing 1 to the orbital construction site. Each of the plurality of segment 90 transport units 7 can be an autonomous or remotely controlled drone or pod, depending on the embodiment of the present invention. The communications assembly 10 is communicably coupled to the plurality of segment 90 transport units 7 through a wireless connection, wherein pre-defined instructions or real-time commands are sent to the plurality of segment 90 transport units 7. Each of the plurality of segment 90 transport units 7 is equipped with a means for grasping the segment 90, a thrust producing means for propulsion, and a navigation means for accurately transporting the segment 90. The communications assembly 10 sends instructions to the plurality of segment 90 transport units 7, wherein said instructions direct the plurality of segment 90 transport units 7 in the proper placement of the segment 90 within the orbital construction site.

Figure 11:
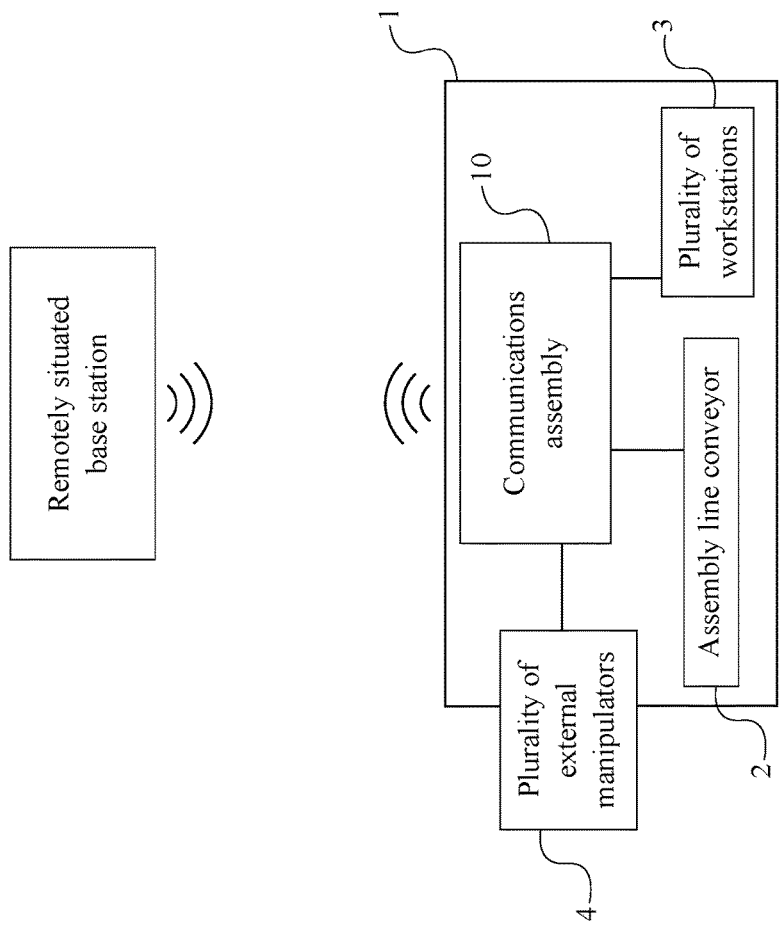
FIG. 11 is a diagram showing the communicable connections between the communications assembly and the remotely situated base station.
Figure 12:
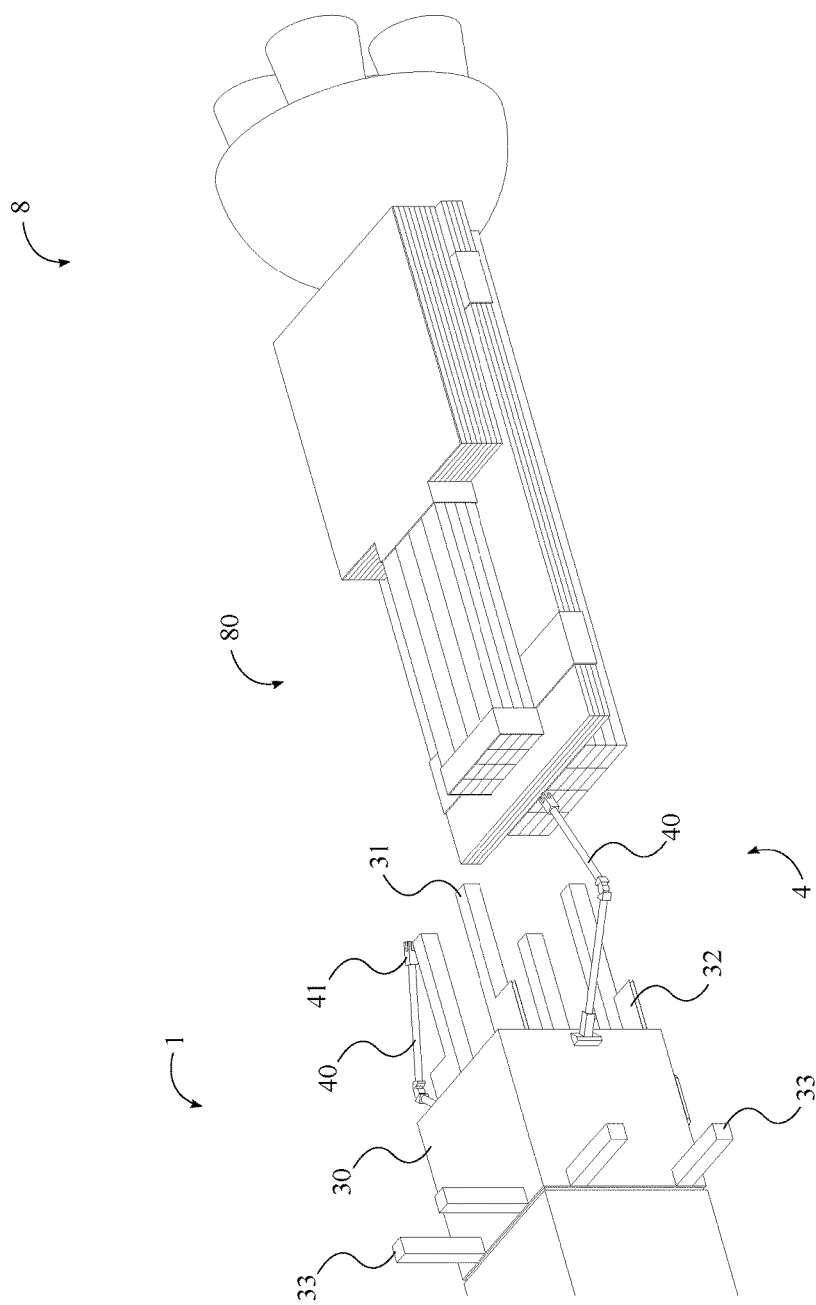
FIG. 12 is a perspective view, wherein the transport spacecraft is communicably coupled to the communications assembly in order to synchronize docking and unloading of the construction materials.
Figure 14:
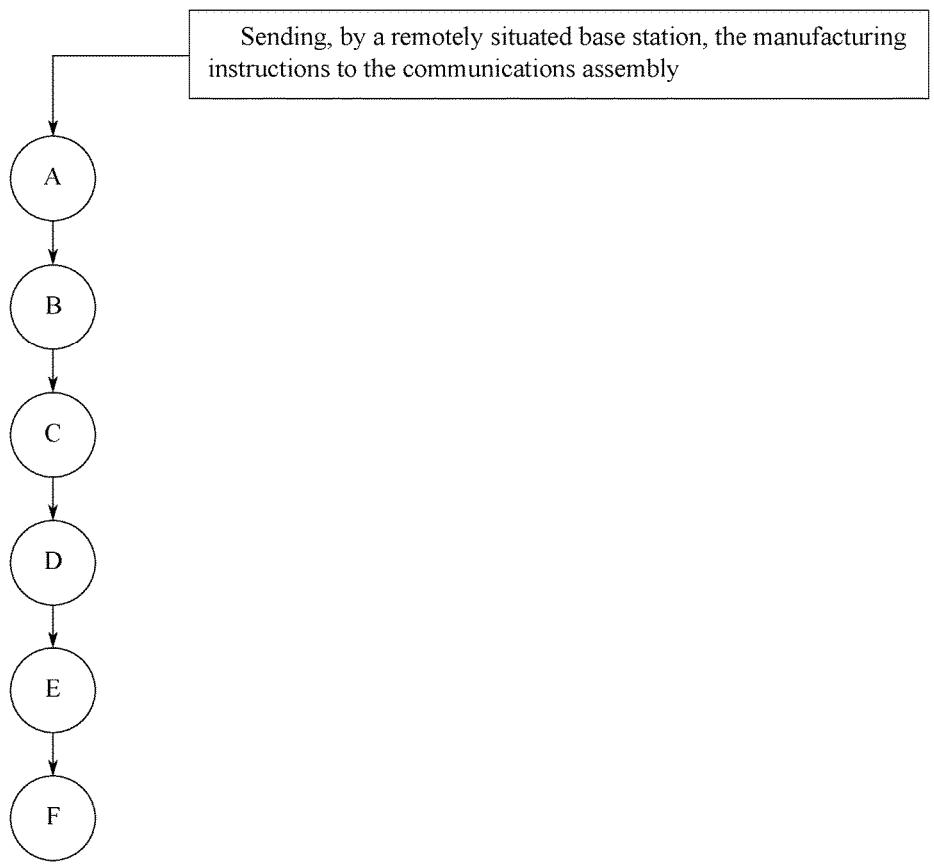
FIG. 14 is a flowchart thereof, depicting the step for receiving the manufacturing instructions from a remotely situated base station.

While the assembly line space structure is the GSAL in the preferred embodiment of the present invention, in other embodiments, the assembly line space structure can be any other type of structure having the communications assembly 10. The communications assembly 10 is essential, as the communications assembly 10 is communicably coupled to the remotely situated base station and the transport spacecraft 8. The remotely situated base station can be any other building or structure on Earth, in orbit, in outer space, etc. that is disconnected from the assembly line space structure. In reference to FIG. 11 and FIG. 14, the remotely situated base station sends the manufacturing instructions to the communications assembly 10. The remotely situated base station can be communicably coupled with the communication assembly 10 using any wireless standard, and may be directly linked to the communications assembly 10 or indirectly through a satellite or other space structure.

Figure 13:
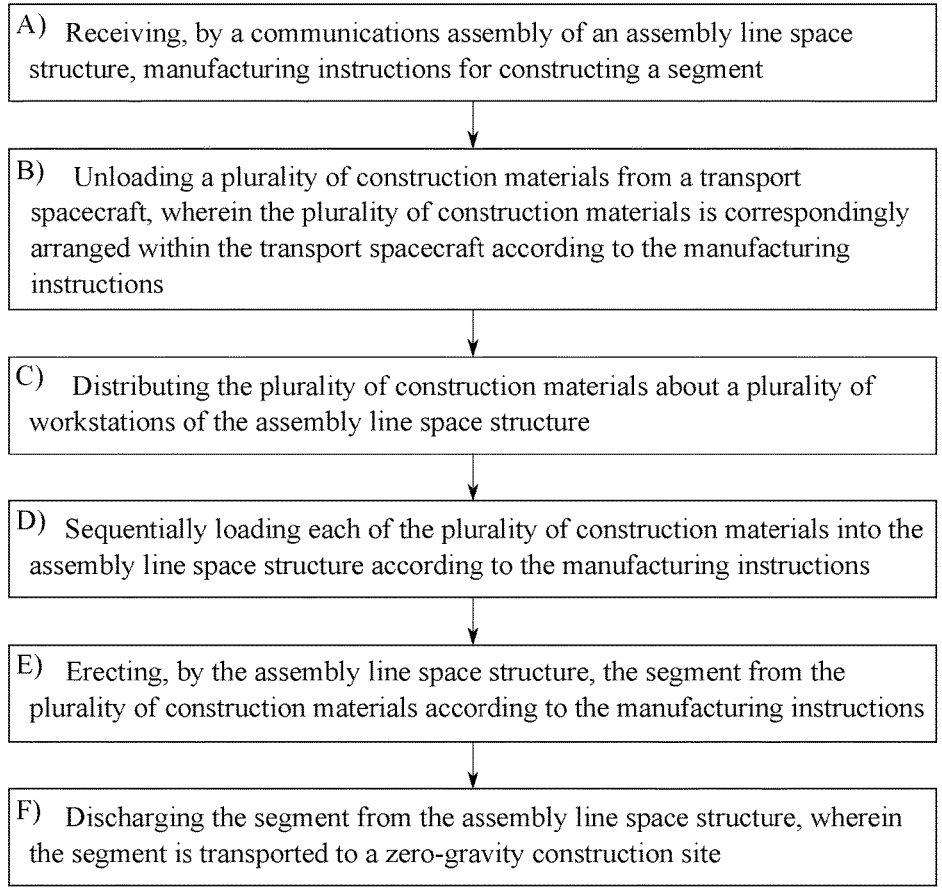
FIG. 13 is a flowchart depicting the steps for autonomously constructing the segment of a modular space structure in a zero gravity environment.
Figure 15:
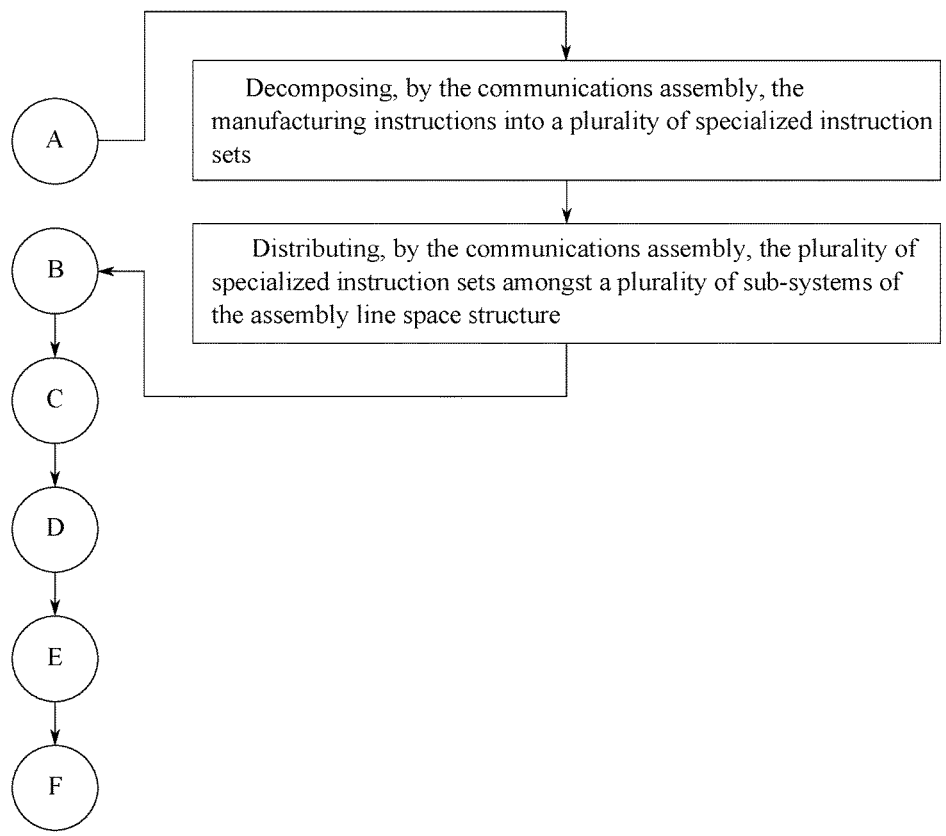
FIG. 15 is a flowchart thereof, depicting the steps for distributing the manufacturing instructions amongst a plurality of sub-systems.

In reference to FIG. 13 and FIG. 15, the communications assembly receives the manufacturing instructions for constructing the segment 90, wherein the manufacturing instructions dictates the unloading of the construction materials 80 and the assembly of the segment 90. Once the communications assembly 10 receives the manufacturing instructions, the communications assembly 10 decomposes the manufacturing instructions into a plurality of specialized instruction sets. The communications assembly 10 then distributes the specialized instruction sets amongst a plurality of sub-systems of the assembly line space structure. The plurality of sub-systems may include, but is not limited to, the spacecraft docking mechanism 5, the plurality of external manipulators 4, the plurality of robotic assemblers 12, the plurality of beam loaders 31, the plurality of plate loaders 32, the plurality of support beam loaders 33, the wall loader 35, the at least one material loader 37, and the assembly line conveyor 2.

Figure 16:
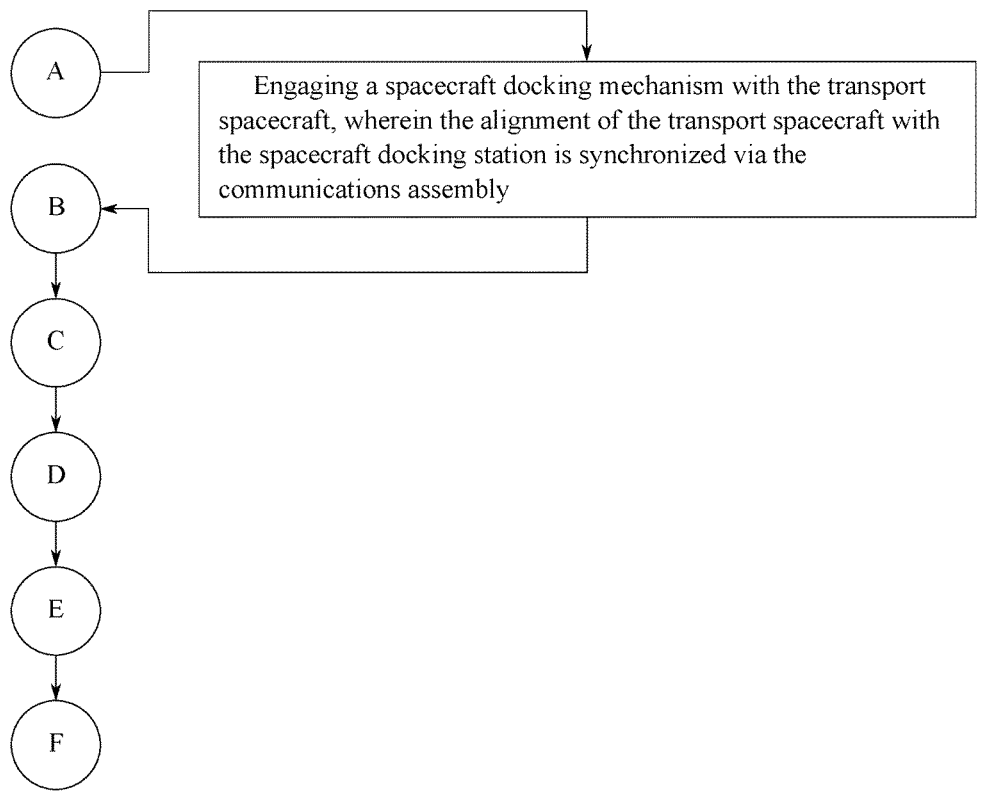
FIG. 16 is a flowchart thereof, depicting the steps for docking the transport spacecraft with the assembly line space structure via the communications assembly.

Each of the specialized instruction sets is intended for one of the plurality of sub-systems, wherein the plurality of specialized instructions sets ensures that each of the plurality of sub-systems is working in unison to construct the segment 90. In reference to FIG. 16, one of the specialized instruction sets is first utilized to synchronize the alignment of the spacecraft docking mechanism 5 with the transport spacecraft 8 via the communications assembly 10. The position of the assembly line space structure and the transport spacecraft 8 is communicated to each other through the communications assembly 10, such that the spacecraft docking mechanism 5 can be engaged with the transport spacecraft 8. Engaging the transport spacecraft 8 with the spacecraft docking station 5 ensures that the two structures remain linked together at the same distance, such that the construction materials 80 can be safely unloaded from the transport spacecraft 8.

Figure 17:
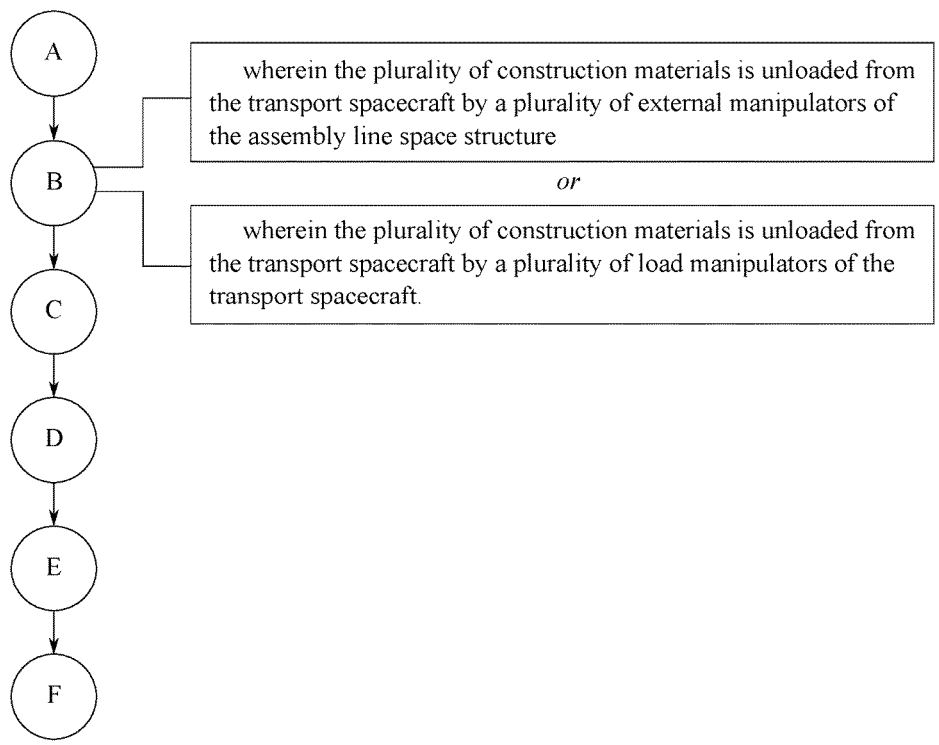
FIG. 17 is a flowchart thereof, depicting methods for unloading the plurality of construction materials from the transport spacecraft.

Once the transport spacecraft 8 is aligned with the assembly line space structure, each of the construction materials 80 is unloaded from the transport spacecraft 8. In reference to FIG. 13, each of the construction materials 80 is correspondingly arranged within the transport spacecraft 8 according to the manufacturing instructions. This allows for the most efficient construction of the segment 90, as each of the construction materials 80 is loaded into the assembly line space structure sequentially according to steps for constructing the segment 90. In reference to FIG. 17, the construction materials 80 can be loaded into the assembly line space structure by the plurality of external manipulators 4 or by a plurality of load manipulators of the transport spacecraft 8. The plurality of load manipulators are similar to the plurality of external manipulators 4, in that the plurality of load manipulators allow the construction materials 80 to be grasped and transported from the transport spacecraft 8 to the assembly line space structure. However, each of the load manipulators is connected to the transport spacecraft 8 and thus is not used in any other steps of constructing the segment 90.

In reference to FIG. 13, each of the construction materials 80 is distributed about the plurality of workstations 3 of the assembly line space structure, wherein each of the construction materials 80 is sequentially loaded into the assembly line space structure according to the manufacturing instructions. The sequential loading of the construction materials 80 ensures that the segment 90 is constructed in the most efficient manner, wherein the plurality of specialized instruction sets which of the construction material 80 is to be inserted into the assembly line space structure via the plurality of sub-systems; namely the plurality of beam loaders 31, the at least one plate loader 32, the plurality of support beam loaders 33, the wall loader 35, and the at least one material loader 37.

Figure 18:
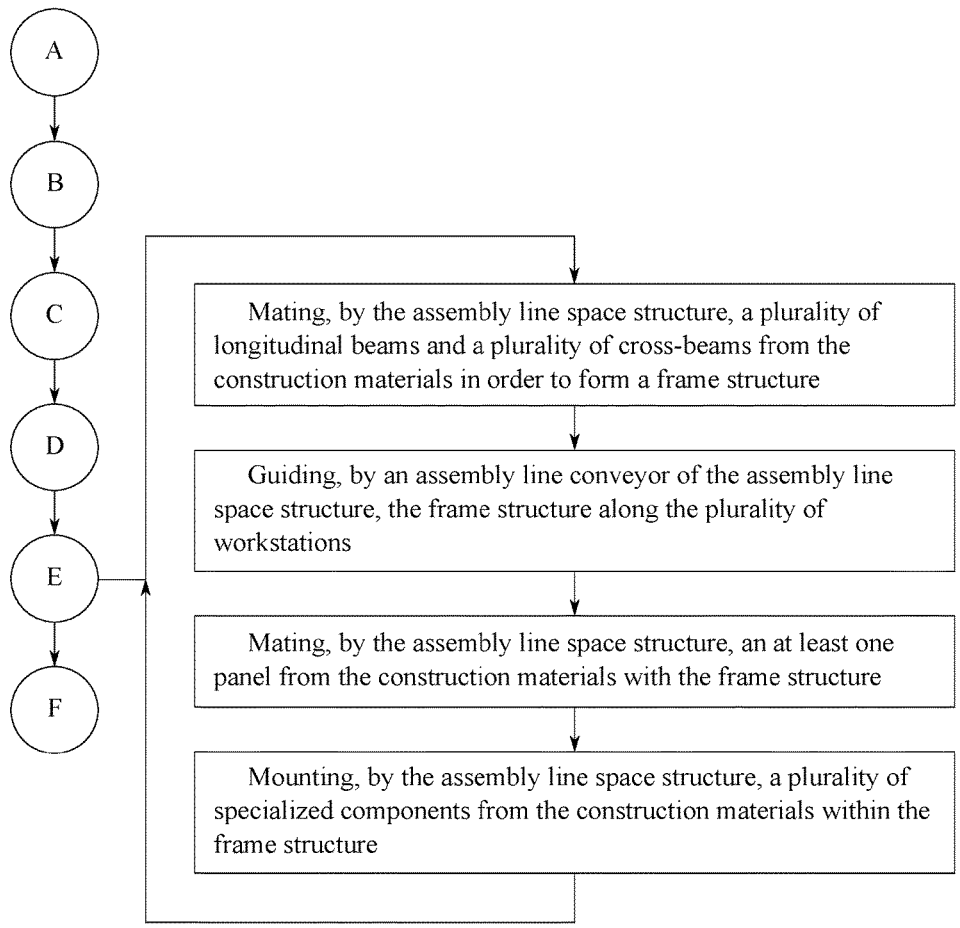
FIG. 18 is a flowchart thereof, depicting steps for constructing the segment within the assembly line space structure.

In further reference to FIG. 13, as each of the construction materials 80 is sequentially loaded into the assembly line space structure, the assembly line space structure erects the segment 90 from the construction materials 80 according to the manufacturing instructions. The manufacturing instructions dictates the placement of each of the construction materials 80, and thus the overall design of the segment 90. In reference to FIG. 18, in a typical construction of the segment 90, the longitudinal beams 81 and the cross-beams 82 are mated together in order to form the frame structure 91. The frame structure 91 is then guided along the plurality of workstations 3 by the assembly line conveyor 2. As the frame structure 91 is guided by the assembly line conveyor 2, the at least one panel 83 is mated with the frame structure 91 and each of the specialized components 84 is mounted within the frame structure 91. Resultantly, the construction of the segment 90 is completed step by step along the plurality of workstations 3 as dictated by the manufacturing instructions.

Figure 19:
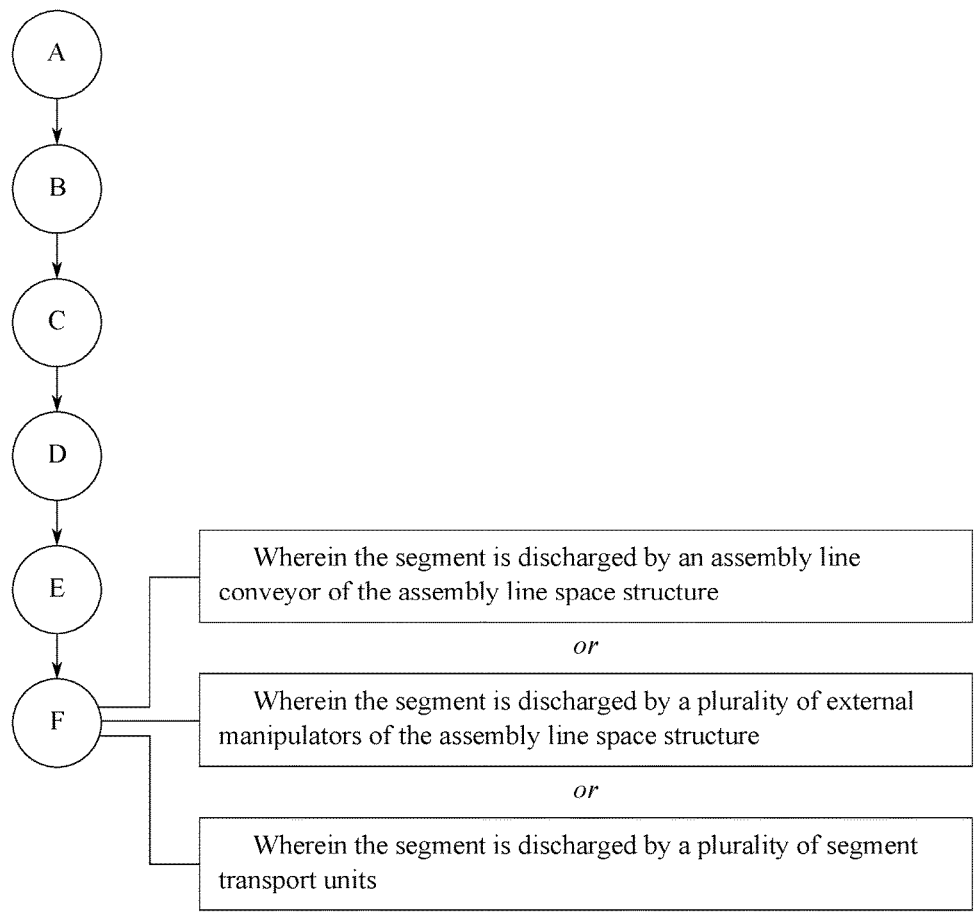
FIG. 19 is a flowchart thereof, depicting methods for removing the segment from the assembly line space structure.

In reference to FIG. 13, once the construction of the segment 90 is complete, the segment is discharged from the assembly line space structure. The segment 90 can be discharged from the assembly line space structure in a number of different ways depending on the configuration of the assembly line space structure. In reference to FIG. 19, the segment 90 can be discharged by the assembly line conveyor 2, the plurality of external manipulators 4, the plurality of segment transport units 7, or a combination thereof. The manner in which the segment 90 is discharged may also be dependent on the shape of the segment 90 that is produced.

Figure 20:
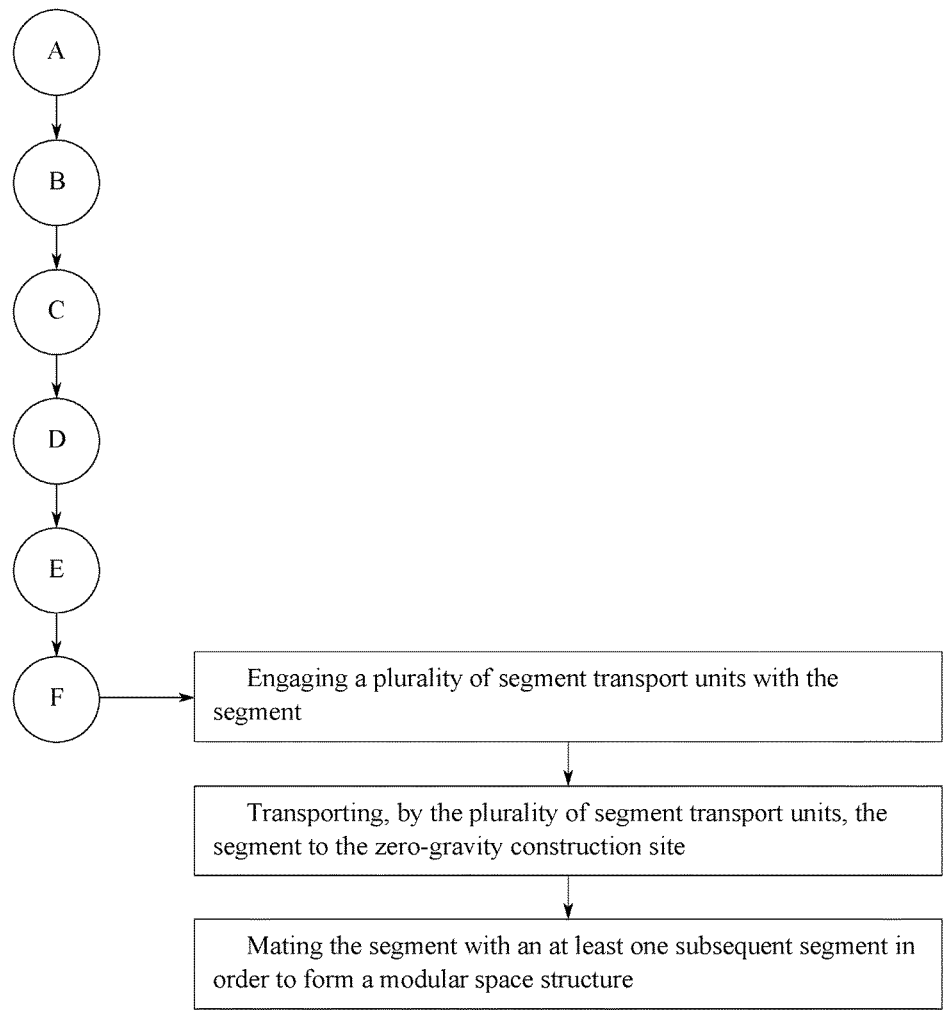
FIG. 20 is a flowchart thereof, depicting steps for integrating the segment with at least one subsequent segment to form the modular space structure.
Figure 21:
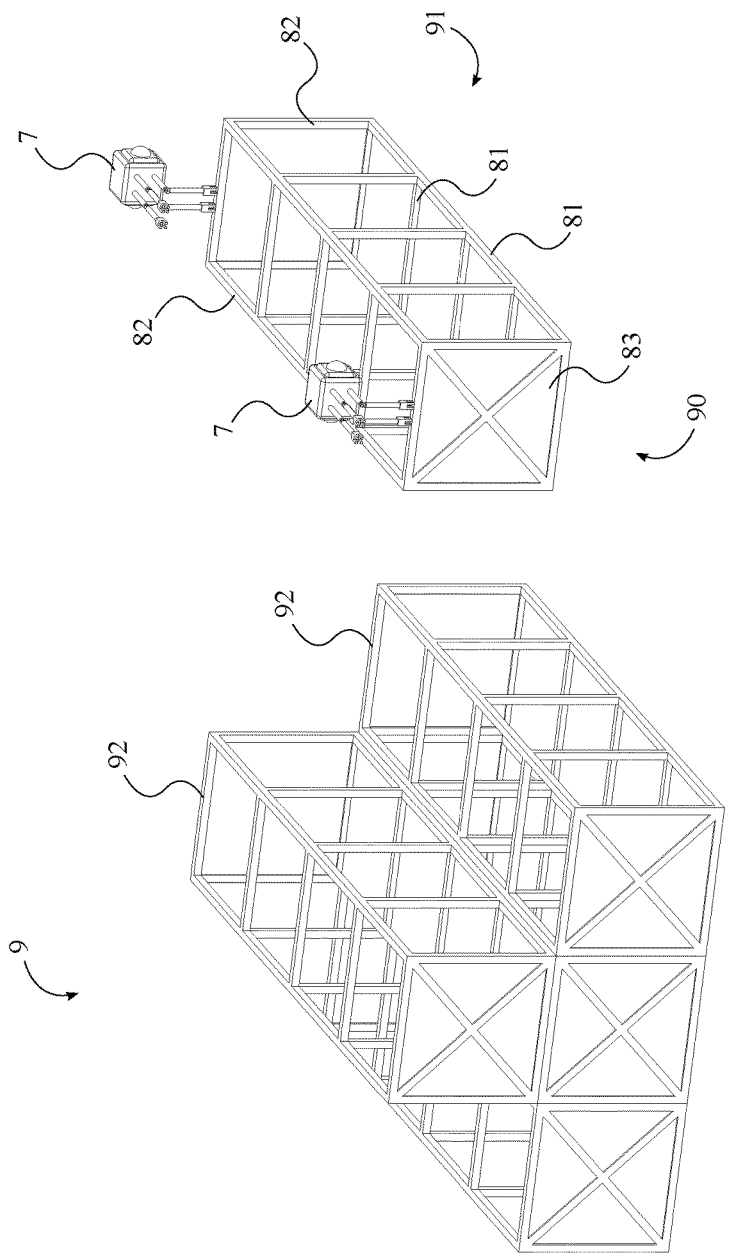
FIG. 21 is a perspective view, wherein the segment is being transported to the zero gravity construction site via the plurality of transport pods.
Figure 22:
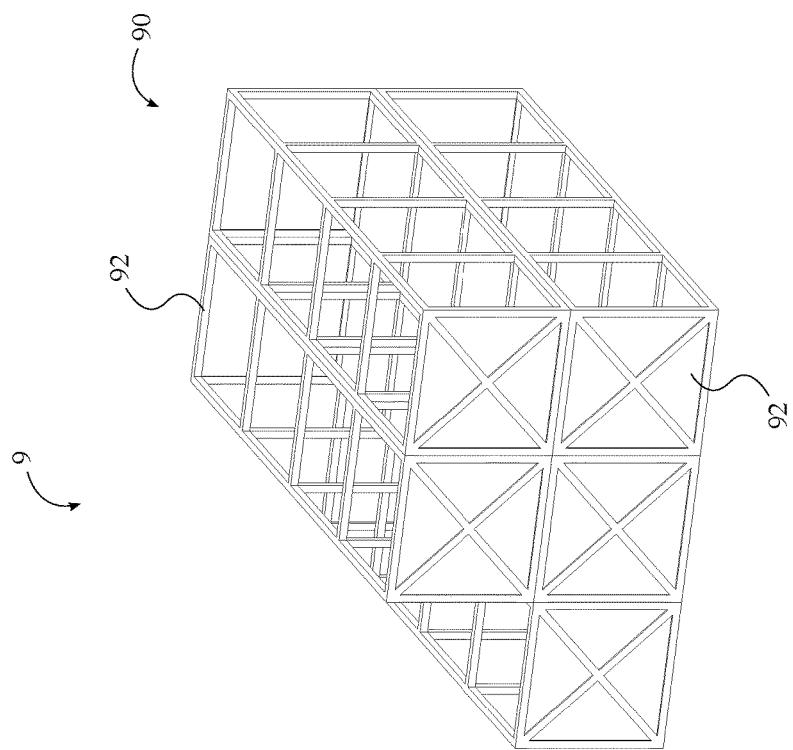
FIG. 22 is a perspective view, wherein the segment is mated to at least one subsequent segment in order to form the modular space station.

Once the segment 90 is discharged from the assembly line space structure, the segment 90 is transported to a zero gravity construction site. The zero gravity construction site may be in orbit or elsewhere in outer space. In reference to FIG. 20 and FIG. 21, the segment 90 is transported to the zero gravity construction site by the plurality of segment transport units. The plurality of segment transport units 7 engages with the segment 90 and then navigates the segment 90 to the zero gravity construction site. The position of the segment 90 in relation to the at least one subsequent segment 92 is dictated by the manufacturing instructions. Once delivered to the zero gravity construction site, the segment 90 is mated with the at least one subsequent segment 92 that has been previously constructed by the assembly line space structure in order to form the modular space structure 9, as depicted in FIG. 22. The assembly line space structure can then continue to produce additional segments, wherein the additional segments are mated with the segment 90 and the at least one subsequent segment 92.

Although the invention has been explained in relation to its preferred embodiment, it is to be understood that many other possible modifications and variations can be made without departing from the spirit and scope of the invention as hereinafter claimed.

What is claimed is:
1. A method for autonomously constructing structural bodies in a zero gravity environment, the method comprises the steps of:
receiving, by a communications assembly of an assembly line space structure, manufacturing instructions for constructing a segment;
sending, by a remotely situated base station, the manufacturing instructions to the communications assembly;
decomposing, by the communications assembly, the manufacturing instructions into a plurality of specialized instruction sets;
distributing, by the communications assembly, the plurality of specialized instruction sets amongst a plurality of sub-systems of the assembly line space structure;
unloading a plurality of construction materials from a transport spacecraft, wherein the plurality of construction materials is correspondingly arranged within the transport spacecraft according to the manufacturing instructions;
distributing the plurality of construction materials about a plurality of workstations of the assembly line space structure;
sequentially loading each of the plurality of construction materials into the assembly line space structure according to the manufacturing instructions;

erecting, by the assembly line space structure, the segment from the plurality of construction materials according to the manufacturing instructions;

guiding, by an assembly line conveyor of the assembly line space structure, a frame structure assembled from the construction materials along the plurality of workstations; and discharging the segment from the assembly line conveyor of the assembly line space structure, wherein the segment is transported to a zero-gravity construction site.

2. The method for autonomously constructing structural bodies in a zero gravity environment, the method as claimed in claim 1 further comprises the step of:

engaging a spacecraft docking mechanism with the transport spacecraft, wherein the alignment of the transport spacecraft with the spacecraft docking station is synchronized via the communications assembly.

3. The method for autonomously constructing structural bodies in a zero gravity environment, the method as claimed in claim 1, wherein the plurality of construction materials is unloaded from the transport spacecraft by a plurality of external manipulators of the assembly line space structure.

4. The method for autonomously constructing structural bodies in a zero gravity environment, the method as claimed in claim 1, wherein the plurality of construction materials is unloaded from the transport spacecraft by a plurality of load manipulators of the transport spacecraft.

5. The method for autonomously constructing structural bodies in a zero gravity environment, the method as claimed in claim 1 further comprises the step of:

mating, by the assembly line space structure, a plurality of longitudinal beams and a plurality of cross-beams from the construction materials in order to form a frame structure;

mating, by the assembly line space structure, an at least one panel from the construction materials with the frame structure; and mounting, by the assembly line space structure, a plurality of specialized components from the construction materials within the frame structure.

6. The method for autonomously constructing structural bodies in a zero gravity environment, the method as claimed in claim 1, wherein the segment is discharged by an assembly line conveyor of the assembly line space structure.

7. The method for autonomously constructing structural bodies in a zero gravity environment, the method as claimed in claim 1, wherein the segment is discharged by a plurality of external manipulators of the assembly line space structure.

8. The method for autonomously constructing structural bodies in a zero gravity environment, the method as claimed in claim 1, wherein the segment is discharged by a plurality of segment transport units.

9. The method for autonomously constructing structural bodies in a zero gravity environment, the method as claimed in claim 1 further comprises the steps of:

engaging a plurality of segment transport units with the segment;

transporting, by the plurality of segment transport units, the segment to the zero-gravity construction site; and mating the segment with an at least one subsequent segment in order to form a modular space structure.

\* \* \* \* \*